340-567 SR

12/18/79 OR 4,179,691

United States Patent [19]

Keller

[11] 4,179,691

[45] Dec. 18, 1979

[54] INFRARED INTRUSION DETECTOR CIRCUIT

[75] Inventor: Hansjürg Keller, Männedorf, Switzerland

[73] Assignee: Cerberus AG, Männedorf, Switzerland

[21] Appl. No.: 817,916

[22] Filed: Jul. 22, 1977

[30] Foreign Application Priority Data

Nov. 15, 1976 [CH] Switzerland ........................ 14272/76

[51] Int. Cl.[2] ........................ G01D 27/04; G08B 13/18

[52] U.S. Cl. .................................... 340/567; 250/221; 250/349; 307/360; 328/109; 340/565

[58] Field of Search ........... 340/258 R, 258 B, 258 D, 340/555, 556, 565, 567; 250/203, 221, 338, 349; 307/232, 360; 328/109, 115

[56] References Cited

U.S. PATENT DOCUMENTS

| | | | |
|---|---|---|---|
| 3,720,131 | 3/1973 | Frohock, Jr. et al. | 89/41 ME |
| 3,858,192 | 12/1974 | Fischer | 340/258 R |
| 3,928,849 | 12/1975 | Schwarz | 340/410 |
| 3,958,118 | 5/1976 | Schwarz | 250/221 |

*Primary Examiner*—John W. Caldwell, Sr.
*Assistant Examiner*—Joseph E. Nowicki
*Attorney, Agent, or Firm*—Werner W. Kleeman

[57] ABSTRACT

A circuit for an infrared intrusion detector comprising a plurality of receiving directions or regions which are separated from one another and a radiation receiver, at the output of which there appears an electrical signal corresponding to the infrared radiation which is absorbed by all of the receiving directions or regions. The circuit is structured such that an alarm signal is delivered when the received infrared radiation both ascends in a predetermined manner as well as descends in a predetermined manner within a given delay time.

19 Claims, 5 Drawing Figures

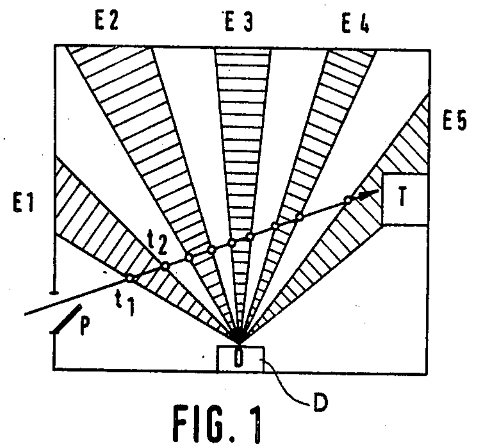
FIG. 1
FIG. 2a
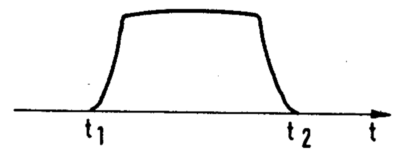
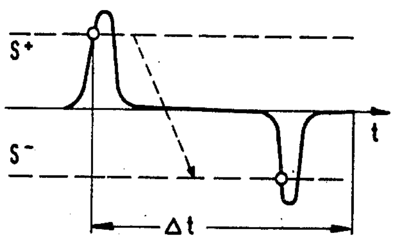
FIG. 2b
FIG. 3
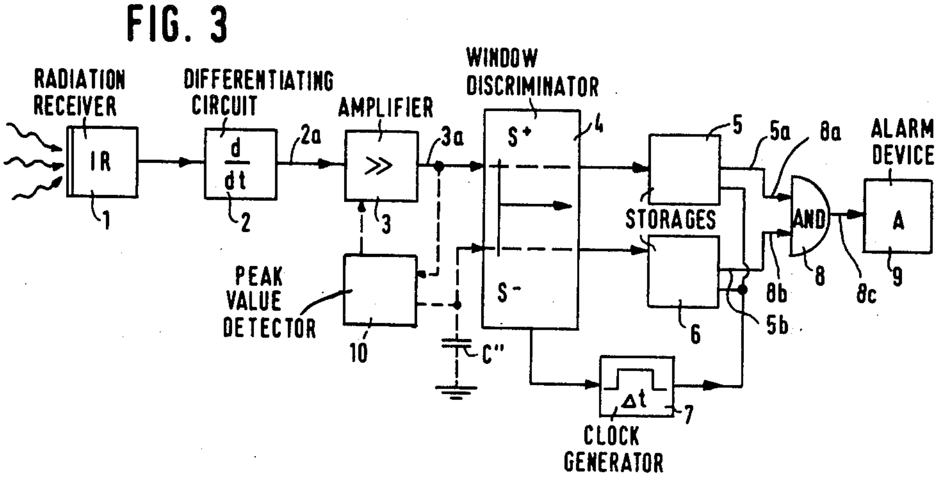
FIG. 4
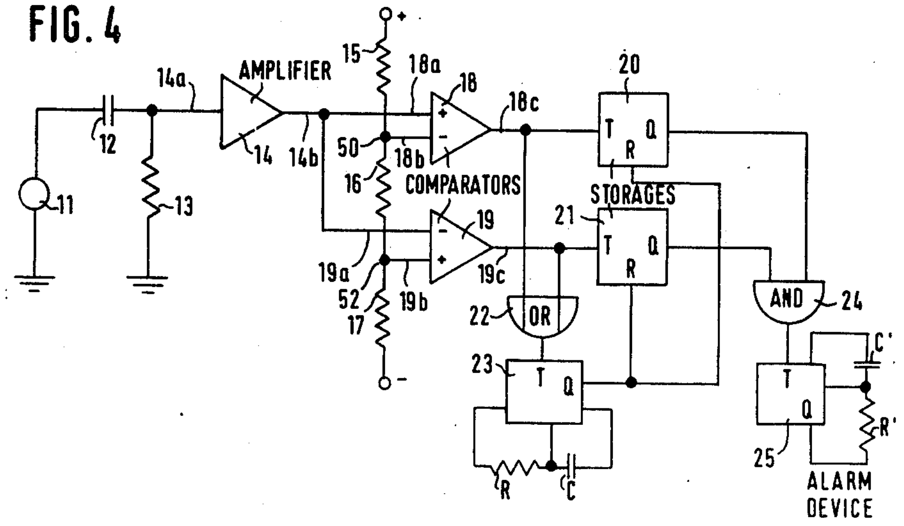

INFRARED INTRUSION DETECTOR CIRCUIT

BACKGROUND OF THE INVENTION

The present invention relates to a new and improved construction of a circuit for an infrared intrusion detector—also sometimes referred to in the art as an infrared radiation-burglary detector—of the type comprising a plurality of receiving directions or receiving regions which are separated from one another and a radiation receiver, at the output of which there appears an electrical signal in accordance with the infrared radiation which is absorbed from all of the receiving directions or receiving regions.

With detectors of this general type, exemplary constructions of which have been disclosed for instance in German petty Pat. Nos. G 76.15724 and G. 76.16785, the disclosures of which are incorporated herein by reference, it is possible to detect the presence of an object, for instance the entry of an unauthorized person or burglar, in a supervised room or area by detecting the infrared radiation which is transmitted by such object or otherwise. What may be detected in this regard is, for instance, the inherent or self-radiation of the person, which lies in a range between 5 and 20$\mu$, preferably between 7 and 14$\mu$. Instead of detecting the self-radiation it is also possible to however provide a source of infrared radiation and to evaluate the radiation which is reflected by the object or the human being. In each instance, the employed optical components must be accommodated or matched to the evaluated wavelength range, i.e. must possess adequate permeability for the employed infrared radiation and the reflector must have a sufficient reflection capability for infrared radiation.

In practice it is necessary to be able to detect even the slight movements of a person in a supervised room or area. Since the total radiation only slightly varies, it has been found to be advantageous to monitor the supervised room or area by covering the same with a number of separate viewing fields or receiving regions with intermediately dispositioned darkened zones or fields. A human being who is in motion, for instance typically a burglar, is thus forced, during the course of his or her movement, to pass a number of times through the boundary or interface between a receiving region and a dark zone or field. Consequently, the output signal of the radiation receiver varies, and such receiver or receiver component, with the heretofore known detectors, can contain either an infrared sensor which is common to all of the receiving regions or a number of separate sensors in an addition circuit.

The evaluation circuits of state-of-the-art detectors containing a number of mutually separated receiving regions employ an alternating-current amplifier constructed as a bandpass for the purpose of amplifying the signals transmitted by the radiation receiver. The frequency range of such amplifier is tuned to the typical or normally encountered speeds of movement of a burglar or the object to be detected, for instance in a range between 0.2 and 3 Hz. Yet, with such type circuit an intruder or burglar only then can be however detected if the alternating-current signal prevails for a predetermined period of time, i.e. if there have been traversed in succession a sufficiently large number of receiving region-boundaries. An instrusion detector containing such an evaluation circuit can be, however, fooled by a burglar or other individual if he or she carries out particularly careful and slow movements. Hence, the reliability of such equipment in practice is too limited.

However, in order to overcome this drawback there have become known to the art also evaluation circuits which already trigger an alarm signal when the output voltage of the amplifier exceeds or falls below a predetermined threshold value only a single time, i.e. when there has been traversed only one boundary of a receiving region. Yet, what is disadvantageous with this solution is that the bandpass-amplifier must possess a very low frequency response or characteristic, in order to be also able to detect slow movements. This requirement is associated, on the one hand, with high technical expenditure in the equipment, and, on the other hand, brings with it the danger that in the presence of changes in the natural ambient or surrounding conditions it is equally possible to trigger an alarm signal. Additionally, individual spurious signals of sufficiently large amplitude, which in an optical or electrical manner can impinge the detector from externally thereof or can be generated by the detector itself, can produce false alarms.

SUMMARY OF THE INVENTION

Hence, with the foregoing in mind, it is a primary object of the present invention to provide an improved infrared intrusion detector circuit which is not associated with the aforementioned drawbacks and limitations of the prior art proposals.

Another and more specific object of the present invention aims at overcoming the aforementioned drawbacks and providing a circuit for an infrared intrusion detector which, on the one hand, also can positively detect even very slow movements, and, on the other hand, works relatively free of disturbances and safeguards against triggering false alarms, and furthermore, is of simple construction.

Yet a further significant object of the present invention aims at the provision of an improved infrared intrusion detector circuit which is relatively simple in construction and design, economical to fabricate, not readily prone to disturbances or triggering of false alarms, and provides a high degree of security in supervising a room or area while making it exceedingly difficult for an unauthorized individual who has entered such room or area to "fool" the intrusion detector.

Now in order to implement these and still further objects of the invention, which will become more readily apparent as the description proceeds, the infrared intrusion detector circuit of the present invention is structured such that an alarm signal is given when the received infrared radiation, within a predetermined delay time, both ascends or rises in a predetermined manner as well as also descends or falls in a predetermined manner.

By virtue of the foregoing, there is achieved the beneficial result that there is exactly then triggered an alarm signal when an object successively arrives within a receiving region and again departs therefrom within a predetermined delay time. Consequently, there is successively recorded initially an increase of the received radiation and thereafter again a decrease. Triggering of the alarm signal thus occurs at a more incipient stage than with the prior art circuitry, i.e. already when completely passing a single receiving region, wherein, however, there is eliminated the danger of triggering a false alarm as with the state-of-the-art circuits upon passing-through only one radiation receiving-boundary.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 schematically illustrates an arrangement of an infrared detector in a room or area which is to be supervised or protected;

FIGS. 2*a* and 2*b* respectively show the course of the voltage at two different points of a circuit constructed according to the teachings of the present invention;

FIG. 3 is a block circuit diagram of a circuit designed according to the present invention; and FIG. 4 is a circuit diagram showing in detail such an infrared intrusion detector circuit as contemplated by the present invention.

DETAILED DESCRIPTION OF THE PREFERRED EMBODIMENTS

Describing now the drawings, in FIG. 1 there is illustrated an arrangement of an infrared radiation detector D of known construction having for instance five substantially strip-shaped receiving regions E1, E2, E3, E4 and E5 which are aligned such that the protected or supervised room or the like is covered as well as possible between an entry door P and an object to be protected, for instance a vault or safe T, so that an intruder, typically a burglar, who must enter through the door P must pass through a number of such receiving regions in order to reach the vault or safe T. Details of the infrared radiation detector D are not critical to the understanding of the invention, since, as mentioned, the same may be of conventional design. Yet, certain possibilities of structuring the infrared radiation-burglary detector have been disclosed, for instance, in the commonly assigned, United States application Ser. No. 738,909, filed Nov. 4, 1976, now United States Pat. No. 4,081,680, granted Mar. 28, 1978, of the inventor of this development, and entitled "Infrared Radiation-Burglary Detector", to which reference may be readily had and the disclosure of which is incorporated herein by reference.

At the infrared receiver, such as the radiation receiver 1 of the arrangement of FIG. 3, of the detector D there thus appears, as best seen by referring to FIG. 2*a*, a rise or ascent of the output signal at the time t1, when the intruder or burglar who is in motion passes the boundary or interface to the first receiving region E1. As soon as at time t2 such intruder again leaves such region, then the signal agains drops to its original value.

Now in FIG. 3 there is illustrated a block circuit diagram of an evaluation circuit constructed according to the invention, which is connected with the radiation receiver 1 of the radiation detector D. The output signal of such receiver 1 is delivered to a differentiating element or circuit 2, at the output 2*a* of which there appears a signal corresponding to the schematic showing of FIG. 2*b*, i.e. upon increase of radiation at the time t1 there appears a positive pulse and during the subsequent radiation decrease at time t2 a negative pulse. The output signal of the differentiating circuit 2 is delivered by means of an amplifier 3 to a window discriminator 4. This window discriminator 4 is structured such that a signal appears at one of its outputs as soon as the input signal exceeds a predetermined upper or positive threshold value S+ and at another output there appears a signal when the input signal falls below a lower or negative threshold value S−. Both of the output signals of the window discriminator 4 are transmitted to a respective storage or store 5 and 6. At the same time upon exceeding the one threshold value, for instance, the positive threshold, there is placed into operation a clock generator 7 which resets both of the storages or stores 5 and 6 after expiration of the delay time Δt. The outputs 5*a* and 5*b* of both of the storages or stores 5 and 6 are connected with the inputs 8*a* and 8*b* of an AND-gate 8, the output 8*c* of which is operatively connected with an alarm device 9. By means of the clock generator 7 there is thus brought about that through the agency of the AND-gate 8 there is then, and only then, triggered an alarm signal when there is delivered to the window discriminator 4*a* sufficiently great pulse of predetermined polarity, for instance a positive pulse, and within a certain delay time (Δt∼1 second or greater), governed by the clock generator 7, there is delivered to the window discriminator 4 a sufficiently great pulse of the opposite polarity, for instance a negative pulse.

Such circuit always then transmits a signal when a positive pulse and a negative pulse follow one another in succession. A certain drawback is present inasmuch as both the upper threshold as well as also the lower threshold value are fixedly adjusted. However, the amplitude of the pulse produced by an intruder is markedly variable, depending upon the distance to the detector and the temperature differences with respect to the surroundings, yet it is to be expected that, for instance, a negative pulse produced by an intruder will possess approximately the same order of magnitude as the preceding positive pulse or vice versa. This characteristic can be beneficially additionally employed for increasing the operational reliability and for avoiding triggering of false alarms in that there may be connected at the output 3*a* of the amplifier 3 a peak value-detector 10, i.e. a peak voltage-detector. Such peak value detectors are well known in the art and commercially available on the market. For instance, they have been disclosed in various application notes (abbreviated herein "AN") of the well known firm National Semiconductor Corp., of Santa Clara, California, reference being made, by way of illustration and example specifically to AN-4, April 1968, circuit of FIG. 7; AN-31, February 1970, the circuit labelled "Low Drift Peak Detector"; AN-51, September 1971, circuit of FIG. 15; AN-72, September 1972, circuit of FIG. 89; and AN-129, August 1975, circuit of FIG. 19. This detector 10 either can be feedback coupled with the amplifier 3 and the gain of which can be altered as a function of the magnitude of the first incoming pulse so intensely that a second pulse is amplified in such a manner that it only then exceeds the threshold value of the window discriminator 4 when it approximately possesses the same magnitude as the preceding pulse. The peak value detector 10 also can be connected however with the window discriminator 4, so that its threshold values S+and S−, respectively, are automatically shifted upwardly or downwardly and regulated in accordance with the peak value of the first incoming pulse. In this manner there is achieved the result that an alarm signal is only then triggered when the second pulse of opposite polarity at least possesses the same magnitude as the preceding pulse.

Turning attention now to FIG. 4 there is illustrated therein a suitable constructional embodiment of infrared intrusion detector circuit in detail and structured according to the teachings of the invention. There will be recognized a radiation receiver 11 which is common to all of the receiving regions or directions—usually conveniently referred to herein as receiving regions. The output signal of the radiation receiver 11 is delivered by means of an RC-element 12, 13 composed of a capacitor 12 and a resistor 13 to the input 14*a* of an amplifier 14. The RC-element 12, 13 functions as a differentiation or differentiating element. Instead of arranging the differentiating element 12, 13 in the manner depicted, it also can be connected following the output 14*b* of the amplifier 14 or there can be employed an amplifier and/or a radiation receiver which by virtue of its inherent frequency behaviour itself brings about a type of differentiation of the course of the signal. The window discriminator, in the embodiment under discussion, is composed of two comparators 18 and 19, wherein the positive or non-inverting input 18*a* of the one comparator 18 and the negative or inverting input 19*a* of the other comparator 19 are coupled with the output 14*b* of the amplifier 14. The other inputs 18*b* and 19*b* of both of the comparators 18 and 19 are each connected with a respective tap 50 and 52 of a voltage divider composed of the resistors 15, 16 and 17, which taps 50 and 52 provide respective reference potentials for the comparators 18 and 19, respectively. In particular, the divider ratios of such voltage divider 15, 16 and 17 determine the threshold values of both comparators 18 and 19. If the input voltage at the non-inverting input 18*a* of the comparator 18 now exceeds the threshold value determined by the inverting input 18*b*, then the input T of the subsequently series connected storage 20 has a signal delivered thereto, and equally the storage 21 which is connected in series following the comparator 19 likewise has a signal delivered thereto as soon as the input voltage at the inverting input 19*a* of the comparator 19 falls below the threshold governed by its non-inverting input 19*b*. Both of the outputs 18*c* and 19*c* of the comparators 18 and 19 are connected by means of an OR-gate 22 with a monostable or one-shot multi-vibrator 23, which after expiration of its delay time extinguishes both of the storages 20 and 21 by means of their resetting inputs R. The monostable multivibrator 23 is provided with the resistor R and capacitor C. Continuing, on the other hand, the outputs Q both storages 20 and 21 are again connected by means of an AND-gate 24 with an alarm signal circuit 25 provided with the resistor R' and capacitor C'. This alarm signal circuit 25 then triggers an alarm signal when both of the storages 20 and 21 are simultaneously set, something which is only possible when a positive pulse and a negative pulse arrive within the reset time of the monostable multivibrator 23. Since this monostable multivibrator 23 is controlled through the intermediary of the OR-gate 22 from the outputs 18*c* and 19*c* of both comparators 18 and 19, it is thus immaterial whether the positive pulse or the negative pulse is the first arriving pulse, i.e. whether the intruder has completely passed through a receiving region or an intermediately disposed dark zone or field. In both instances there is ensured for the positive triggering of an alarm signal.

At this point it is mentioned that all of the employed components can be constructed as commercially available integrated circuits. The time-constant of the RC-element must of course be accommodated to the speed of movement which is to be expected of the object to be detected (e.g. RC∼1 second or greater). It is here further indicated that instead of using a differentiating element or circuit with subsequently connected window discriminator there also can be employed other known threshold value-detector circuits possessing equivalent functions, which are suitable for detecting passage upwardly or downwardly through a threshold, i.e. additionally evaluating the change in direction of the intensity of the received infrared radiation. Then there is triggered an alarm signal when a threshold is exceeded at least one time upwardly within a predetermined delay time, that is to say, in the direction of an increase, and falls below the threshold at least once, that is to say, in the direction of a decrease. The thresholds for the increase and decrease can also be chosen to be different.

Finally, at this point it is mentioned that, by way of example and not limitation, for the circuitry of FIG. 4, each of the integrated circuit components can be commercially obtained from Motorola Company, and are listed below under this company's commercial designation as follows:

| | |
|---|---|
| Amplifier 14 | Motorola type MC 1741 |
| Comparators 18, 19 | Motorola type MC 3302 |
| Storages 20, 21 | Motorola type MC 14027 |
| OR-gate 22 | Motorola type MC 14071 |
| Monostable multivibrator 23 | Motorola type MC 14528 |
| AND-gate 24 | Motorola type MC 14081 |
| Alarm circuit (monostable multivibrator) | Motorola type MC 14528 |

Also, typical exemplary electrical values for the capacitors and resistors used in the circuit configuration of FIG. 4 maybe as follows:

| | |
|---|---|
| Capacitor 12 | 1 μF |
| Resistor 13 | 1 megohm |
| Resistor 15 | 10 kilohms |
| Resistor 16 | 1 kilohm |
| Resistor 17 | 10 kilohms |
| Resistor R | 100 kilohms |
| Capacitor C | 20 μF |
| Resistor R' | 100 kilohms |
| Capacitor C' | 100 μF |

While there are shown and described present preferred embodiments of the invention, it is to be distinctly understood that the invention is not limited thereto, but may be otherwise variously embodied and practiced within the scope of the following claims. Accordingly,

What I claim is:

1. In a circuit arrangement for an infrared intrusion detector of the type possessing a number of mutually spaced receiving regions and a spacing between each two adjacent receiving regions and a radiation receiver providing output electrical signals in accordance with the infrared radiation which is absorbed from all of the receiving regions, the improvement which comprises:

said output electrical signals having an ascent and descent representative of a change in infrared radiation due to an intruder traversing one single receiving region or one single spacing between adjacent receiving regions;

said circuit including:

means responsive to said output electrical signals for providing output electrical signals indicative of the ascent and descent of said change in infrared radiation; and means for processing said output electrical signals of said responsive means for triggering an alarm signal when the received infrared radiation, within a predetermined delay time, only once ascends in a predetermined manner and only once descends in a predetermined manner.

2. The improvement as defined in claim 1, wherein: said responsive means comprises a differentiating circuit for differentiation of the course of the output electrical signals transmitted by the radiation receiver.

3. The improvement as defined in claim 2, wherein: said differentiating circuit comprises an RC-element composed of a capacitor and a resistor.

4. The improvement as defined in claim 3, wherein: said RC-element possesses a time-constant which amounts to at least one second.

5. The improvement as defined in claim 2, wherein: said processing means further includes a window discriminator having a first output and a second output;

a signal appearing at said first output of said window discriminator when the differentiated signal of the radiation receiver exceeds an upper positive threshold value; and a signal appearing at said second output of said window discriminator when the differentiated output signal of the radiation receiver falls below a lower negative threshold value.

6. The improvement as defined in claim 5, wherein: said window discriminator comprises two comparators;

each of said comparators having first and second inputs;

the first input of the first comparator and the second input of the second comparator receiving the differentiated output signal of the radiation receiver; and means for applying a respective reference voltage to the second input of the first comparator and the first input of the second comparator.

7. The improvement as defined in claim 6, wherein: said processing means further includes amplifier means for amplifying the output signal transmitted by the radiation receiver prior to delivery thereof to said two comparators.

8. The improvement as defined in claim 6, wherein: said means for applying the respective reference voltages to both comparators comprises voltage divider means having two caps for applying said respective reference voltages to said two comparators.

9. The improvement as defined in claim 5, wherein: said processing means further includes two storages each having an input and an output and to the inputs of which there are delivered the output signals of the window discriminator.

10. The improvement as defined in claim 9, said processing means further including:

an AND-gate having two inputs and an output;

the outputs of both storages being connected with the inputs of said AND-gate; and alarm signal transmitter means controlled by the output of said AND-gate.

11. The improvement as defined in claim 2, wherein: said processing means including an amplifier connected in circuit with said differentiating circuit.

12. The improvement as defined in claim 1, wherein: said processing means includes means for regulating the delay time so as to amount to at least one second.

13. The improvement as defined in claim 2, wherein: said processing means incorporates means for delivering an alarm signal when the time differentiated signal of the radiation receiver, within the delay time, at least exceeds once an upper positive threshold and at least once falls below a lower negative threshold.

14. The improvement as defined in claim 1, wherein: said processing means includes means for delivering an alarm signal when the output signal of the radiation receiver, within the delay time, at least once exceeds a predetermined threshold in the sense of an increase and at least once falls below a predetermined threshold in the sense of a decrease.

15. In a circuit arrangement for an infrared intrusion detector of the type possessing a number of mutually spaced receiving directions or regions and a radiation receiver at the output of which there appears an electrical signal in accordance with the infrared radiation which is absorbed from all of the receiving directions or regions, the improvement which comprises:

means for structuring said circuit so that there is triggered an alarm signal when the received infrared radiation, within a predetermined delay time, both ascends in a predetermined manner and descends in a predetermined manner;

said structuring means comprising:

a differentiating circuit for differentiation of the course of the signal transmitted by the radiation receiver;

a window discriminator having a first output and a second output;

a signal appearing at said first output of said window discriminator when the differentiated signal of the radiation receiver exceeds an upper positive threshold value;

a signal appearing at said second output of said window discriminator when the differentiated output signal of the radiation receiver falls below a lower negative threshold value;

a respective storage to which there is delivered both of the output signals of the window discriminator;

a clock generator controlled by said window discriminator;

said clock generator having an output;

each of said storages having a reset input;

the output of the clock generator being connected with said reset inputs of both of the storages; and said clock generator being placed into operation upon exceeding one threshold value of the window discriminator and after a predetermined delay resetting both of the storages.

16. The improvement as defined in claim 15, wherein: said clock generator comprises a monostable multivibrator.

17. The improvement as defined in claim 15, further including:

an OR-gate for connecting the clock generator in circuit with both outputs of the window discriminator.

18. In a circuit arrangement for an infrared intrusion detector of the type possessing a number of mutually spaced receiving directions or regions and a radiation receiver at the output of which there appears an electrical signal in accordance with the infrared radiation which is absorbed from all of the receiving directions or regions, the improvement which comprises:

means for structuring said circuit so that there is triggered an alarm signal when the received infrared radiation, within a predetermined delay time, both ascends in a predetermined manner and descends in a predetermined manner;

said structuring means comprising:

a differentiating circuit for differentiation of the course of the signal transmitted by the radiation receiver;

a window discriminator having a first input and a first output and a second input and a second output;

a signal appearing at said first output of said window discriminator when the differentiated signal of the radiation receiver exceeds an upper positive threshold value;

a signal appearing at said second output of said window discriminator when the differentiated output signal of the radiation receiver falls below a lower negative threshold value;

a peak voltage-detector having an input;

said input of said peak voltage-detector being connected with one of said inputs of said window discriminator and receiving an input signal;

said peak voltage-detector regulating at least one of the threshold values of the window discriminator in accordance with the peak value of a pulse arriving of the input of the peak voltage detector as said input signal and which pulse is of a polarity opposite to that of a pulse appearing at the other of said inputs of said window discriminator.

19. The improvement as defined in claim 18, wherein:

said structuring means further includes an amplifier connected in circuit with said differentiating circuit;

said peak voltage-detector being coupled with said amplifier and regulating the gain thereof in accordance with its input signal.

* * * * *